J. R. MILLS.
Wheel-Cultivator.
No. 41,086. Patented Jan. 5. 1864.
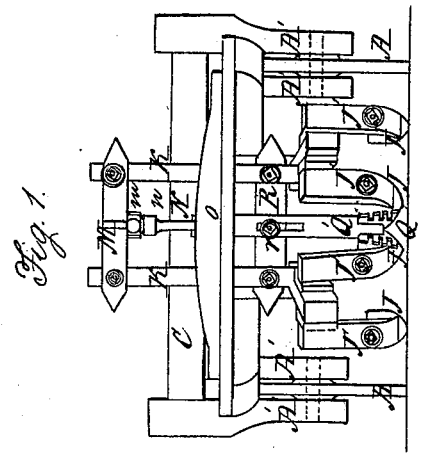
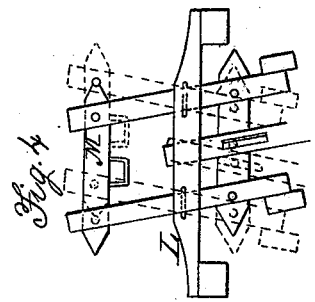
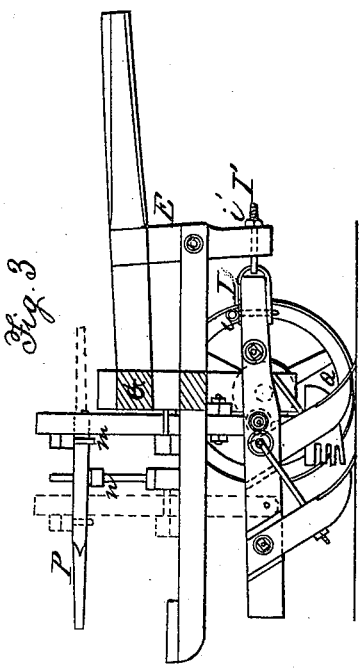
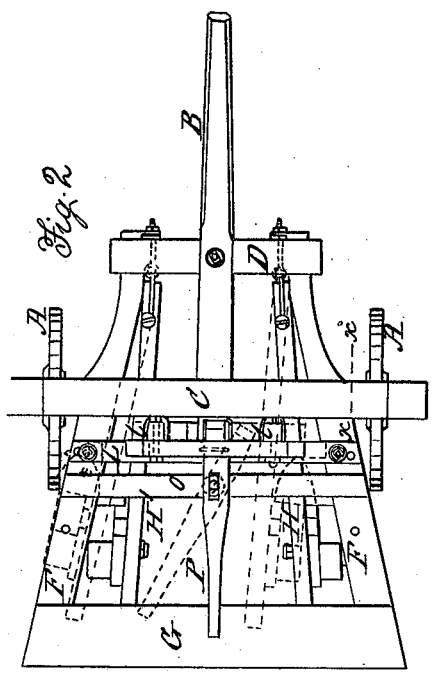
Witnesses:
Charles Smith
Octavius Knight
Inventor:
J. R. Mills
By Munn & Co
Attorney

UNITED STATES PATENT OFFICE.

JAMES R. MILLS, OF BLOOMFIELD, IOWA.

IMPROVEMENT IN CULTIVATORS.

Specification forming part of Letters Patent No. 41,086, dated January 5, 1864.

*To all whom it may concern:*

Be it known that I, JAMES R. MILLS, of Bloomfield, in the county of Davis and State of Iowa, have invented a new and useful Improvement in Cultivators; and I do hereby declare that the following is a full, clear, and exact description of the same, reference being had to the accompanying drawings, making part of this specification, in which—

Figure 1 is a rear end elevation of a machine embodying my invention. Fig. 2 is a plan of the same. Fig. 3 is a sectional elevation of the same, the line of section being indicated on Fig. 2 by line $x\ x$. Fig. 4 is a diagram, showing the extent to which the drag-beams are capable of being moved in a lateral direction.

Similar letters of reference indicate corresponding parts in the several figures.

The peculiarity of this invention consists in a novel combination and arrangement of parts for operating the drag-beams, whereby said drag-beams, with their teeth, may be raised independently or together or moved laterally in either direction by means of a single lever, with the aid of one of the driver's feet, when one set of teeth is to be elevated alone, as will be hereinafter explained; also, in means, substantially as hereinafter described, for adapting the plow to lay furrows at such distance from the plants as to cause water to settle away from the roots thereof.

To enable others skilled in the art to which my invention appertains to fully understand and use the same, I will proceed to describe its construction and operation.

In the accompanying drawings, A A may represent the carrying-wheels, and B the tongue, of the machine. The wheels are keyed to short shafts, which are journaled in bars A′ A′, depending from the cross-beam C, the ordinary axle upon which the carrying-wheels are generally mounted being dispensed with, in order that the working parts of the machine situated between the wheels may be more effectually operated. The tongue B is mortised at its rear end into the cross-beam C, and at a short distance in advance thereof is bolted to the cross-piece D, resting upon uprights E at the front part of the machine.

F F represent the side pieces of the frame, upon the rear end of which the seat G is supported.

H H′ are drag-bars, attached in front to the pendent bars E by universal joints, as clearly shown in Fig. 3, said joints being formed of a clevis, I, embracing the end of the plow-beam, and secured thereto by a pin, $i$, and an eyebolt, I′, which is secured in the pendent bars E by a nut, $i'$, fitting the screw-threaded end of the bolt I′.

J J represent the cultivator-teeth, situated and attached respectively to the inner and outer sides of the drag-beams, their shanks J′ being rigidly secured to the said beams in any suitable manner.

K K are uprights, attached by pivots at their lower ends to the drag-beams and working through staples $l\ l$ in a cross-bar, L, which is removably attached at its ends to the main frame. These uprights are connected by ties M and R, and constitute the means for supporting the plow-beams and of adjusting the teeth J thereof to the depth at which it is desired to cultivate the ground, by means of removable pins (not shown in the drawings) inserted partially through holes in the uprights K K and resting upon the cross-bar L. By these means the plows may be elevated clear of the ground when the machine is passing over roads or ground not to be cultivated.

N represents a post rising from a cross-beam, O, supported on the frame F F. This post is formed with a shoulder or hub, $n$, which serves as a fulcrum for a lever, P, the front and shorter end of which rests against the under side of the cross-tie M, and is confined by a staple, $m$, through which it protrudes.

Q is a shield or fender attached to the lower end of the bar Q′, which is adjustable in height on a screw-bolt, $r$, said bar being held in a vertical position by a box-strap or staple attached to the bar L.

The operation is as follows: While the team is in motion, should it be desired to temporarily suspend the plowing operation in passing over reserved plots, or in order to avoid immovable obstacles, the driver sitting upon his seat G can readily perform this by slightly depressing the long end of the lever P with one hand, comparatively little power being required to retain it in this position until the interruption ceases. If, however, the impediment be presented to the teeth of one beam only, this may be quickly elevated without in any manner interfering with the effective operation of the teeth of the other beam by bearing down with the foot upon the rear end of the beam of the unobstructed teeth and depressing the long end of the lever as before. By turning the same lever from side to side the operator is enabled to throw the teeth laterally in either direction, in order to avoid uprooting plants which may be out of line.

The invention may be modified so as to adapt the machine to lay furrows formed by the cultivator-teeth at such a distance from the corn that the water will settle away from the roots thereof in wet weather. This modification is made by substituting the beam H for the beam H', and vice versa, and transferring the frame K K M R Q, together with the bar L, to the rear of the bar O, where the said bar L is re-attached to the side pieces, F F, by the bolts, suitable orifices being provided said side pieces, F F, for their reception. The uprights K K are then again pivoted or bolted to the beams H H. This position of the parts is shown by red lines in Fig. 3. The plows which run adjacent the corn, it will be seen, now follow the outer ones, and thus form a furrow where a hill would have been formed in the ordinary working position of the parts.

Having thus described my invention, the following is what I claim as new therein and desire to secure by Letters Patent:

1. In combination with the pivoted frame K K M R and drag-beams H H', constructed and arranged as specified, the post N and lever P, constructed and applied in the manner described, to adapt the cultivator-frames to be moved laterally, or either or both of them raised by means of a single lever, as explained.

2. The movable bar O, when employed in combination with the post N, reversible lever P, and reversible beams H H', in the manner described, for the purpose of adapting the machine for furrowing the ground, so as to prevent the settling of water around the roots of the plants in wet weather.

JAMES R. MILLS.

Witnesses:
MORTON C. FLOYD,
J. T. WALTER.